(12) United States Patent
Fauchet et al.

(10) Patent No.: US 8,793,857 B2
(45) Date of Patent: Aug. 5, 2014

(54) METHOD FOR LOCKING A NUT MADE OF A MATERIAL HAVING A LOW CAPABILITY OF PLASTICALLY DEFORMING

(75) Inventors: Christian Fauchet, Ver sur Launette (FR); Laurent Bourges, Auvers sur Oise (FR)

(73) Assignee: Lisi Aerospace (FR)

( * ) Notice: Subject to any disclaimer, the term of this patent is extended or adjusted under 35 U.S.C. 154(b) by 10 days.

(21) Appl. No.: 13/382,671

(22) PCT Filed: Jul. 5, 2010

(86) PCT No.: PCT/FR2010/051405
§ 371 (c)(1),
(2), (4) Date: Mar. 25, 2012

(87) PCT Pub. No.: WO2011/004104
PCT Pub. Date: Jan. 13, 2011

(65) Prior Publication Data
US 2012/0198681 A1 Aug. 9, 2012

(30) Foreign Application Priority Data

Jul. 6, 2009 (FR) ...................................... 09 54660

(51) Int. Cl.
*B23Q 17/00* (2006.01)
*B23P 11/02* (2006.01)
*B21D 37/16* (2006.01)
*B21D 53/24* (2006.01)
*B21K 1/64* (2006.01)

(52) U.S. Cl.
USPC .... 29/447; 29/407.01; 29/407.05; 29/407.08; 72/342.1; 72/342.94; 72/364; 411/82.5

(58) Field of Classification Search
USPC ..................... 29/407.01, 407.05, 407.08, 447, 29/407.06; 72/342.1, 342.94, 364, 702; 470/18, 19, 25, 26, 87; 411/82.5, 411/DIG. 2
See application file for complete search history.

(56) References Cited

U.S. PATENT DOCUMENTS 3,507,313 A * 4/1970 Stockslager .................. 411/284
3,718,957 A 3/1973 Shank
(Continued)

FOREIGN PATENT DOCUMENTS

FR 1155186 7/1956
GB 1227097 3/1971

OTHER PUBLICATIONS

WIPO; International Search Report for PCT/FR2010/051405; Sep. 9, 2010; 2 pages.

*Primary Examiner* — Essama Omgba
*Assistant Examiner* — Darrell C Ford
(74) *Attorney, Agent, or Firm* — Henricks, Slavin & Holmes LLP

(57) ABSTRACT

A method for locking a nut with an inner thread, in which the ultimate tensile strength (Rm) and yield strength (Re) of the material constituting the nut are determined according to temperature. An optimal heating temperature is determined, at which a maximum of a relative plastic interval of the material is reached, said relative plastic interval being defined by the formula (Rm−Re)/Rm, and a maximum heating time is determined, above which the nut presents the risk of deterioration of its microstructure and/or of its initial mechanical strength. The nut is heated to a temperature substantially equal to said optimal temperature and for a heating time of less than said maximum time so that the initial microstructure and mechanical strength of the material constituting the nut are preserved, and a body of the nut is deformed locally by bending.

12 Claims, 3 Drawing Sheets

(56) References Cited

U.S. PATENT DOCUMENTS

| | | | | |
|---|---|---|---|---|
| 3,762,266 A | * | 10/1973 | Thellmann | 411/501 |
| 3,858,262 A | * | 1/1975 | Duffy | 470/19 |
| 3,925,876 A | * | 12/1975 | Curtis | 29/509 |
| 3,938,209 A | * | 2/1976 | Hattan | 470/21 |
| 4,023,389 A | * | 5/1977 | Dibble et al. | 72/38 |
| 4,457,652 A | * | 7/1984 | Pratt | 411/38 |
| 4,595,324 A | * | 6/1986 | Sadri | 411/38 |
| 4,619,568 A | * | 10/1986 | Carstensen | 411/222 |
| 4,880,343 A | * | 11/1989 | Matsumoto | 411/222 |
| 5,417,520 A | * | 5/1995 | Rastall | 405/259.6 |
| 5,603,661 A | * | 2/1997 | Grey | 470/3 |
| 6,851,167 B2 | * | 2/2005 | Harlow et al. | 29/407.01 |
| 7,086,817 B2 | * | 8/2006 | Clinch et al. | 411/111 |
| 7,614,317 B2 | * | 11/2009 | Sickert et al. | 74/422 |
| 7,966,711 B2 | * | 6/2011 | Keener | 29/525.04 |
| 8,191,221 B2 | * | 6/2012 | Suzuki et al. | 29/407.05 |
| 8,382,411 B2 | * | 2/2013 | Dezzani | 411/278 |
| 2004/0213646 A1 | * | 10/2004 | Jakuszeski et al. | 411/544 |
| 2004/0221929 A1 | * | 11/2004 | Hebda et al. | 148/670 |
| 2006/0141242 A1 | * | 6/2006 | Keener | 428/334 |
| 2008/0292899 A1 | * | 11/2008 | Tanimoto et al. | 428/593 |
| 2009/0047100 A1 | * | 2/2009 | Keener | 411/501 |
| 2009/0120155 A1 | * | 5/2009 | Minamoto et al. | 72/353.2 |
| 2009/0178262 A1 | * | 7/2009 | Reid et al. | 29/263 |
| 2009/0311072 A1 | * | 12/2009 | Kruse et al. | 411/190 |
| 2011/0232349 A1 | * | 9/2011 | Hebda et al. | 72/202 |
| 2012/0237789 A1 | * | 9/2012 | Wang et al. | 428/626 |
| 2013/0129444 A1 | * | 5/2013 | May et al. | 411/234 |
| 2013/0223954 A1 | * | 8/2013 | Ambros | 411/366.1 |

* cited by examiner

METHOD FOR LOCKING A NUT MADE OF A MATERIAL HAVING A LOW CAPABILITY OF PLASTICALLY DEFORMING

This invention relates to a method for locking by deformation of a nut made out of a material with a low plastic deformation capacity. The technical field of the invention relates, in a general manner, to that of nuts. More particularly, the invention relates to nuts manufactured from a material with a high level of mechanical strength and a correlatively low plastic deformation capacity, such as, for example nickel, titanium or cobalt alloys.

In order to fully understand the following text, it should be specified that a locking operation of a nut consists in creating, between the inner thread of the nut and the outer thread of an associated screw, a high enough level of friction torque to avoid any untimely unscrewing of the nut in use, in particular under the effect from vibrations. The friction torque must however not make the initial screwing operation of the nut during assembly excessively difficult or uncertain.

In the prior art, document FR 1 155 186 is known in particular, which discloses a method for locking standard nuts by radial deformation of at least two sides of the body of the nut by means of at least two pressure pins. In the most common applications, the standard nuts are made out of low alloy steels, constituting materials that easily resist such a deformation.

However, this method proves to be unsuited and problematic for locking nuts made out of high-strength special alloys such as those used in aeronautical construction. Indeed, these materials have a lower plastic deformation capacity than low alloy steels. Miniature cracks may appear on either side of the deformed sides and significantly deteriorate the static mechanical strength and mechanical fatigue strength of the nut. Moreover, due to this low plastic deformation capacity, the permanent deformation, required for locking, is produced abruptly and not progressively in such a way that it may immediately become excessive and compromise the correct assembly of the nut on the screw.

Moreover, radial plastic deformation of the body of a nut performed at room temperature, according to standard methods, creates a second problem. This problem is connected to the known phenomenon of springback of a metallic material following plastic deformation. Indeed, when the body of a nut undergoing permanent radial deformation, for example in the form of ovalisation, this is not fully preserved when the stress applied is removed. A partial springback is produced, tending to change the oval shape back to the initial circular shape. This springback is all the more significant as the yield strength of the material of the nut increases. This phenomenon results in a significant variability of the final deformation, represented by a significant variability of the locking torque obtained, to the extent that the deformation level must often be adjusted by successive tests so as to be able to adjust the locking torque within a minimum/maximum tolerance range defined by the technical specifications.

Document GB1227097 illustrates a method for locally heating the nut before performing the plastic deformation operation. Indeed, one of ordinary skill in the art knows that heating a metal reduces its yield strength.

However, choosing a too high heating temperature is capable of causing deterioration to the microstructure of the material. The microstructure is defined by a set of characteristics of the metallic structure of the material such as the grain size, their morphology and the proportion of different phases for multiphase alloys. This microstructure depends in part on the physical properties of the nut, such as its mechanical strength.

A heating temperature should therefore advantageously be determined, enabling the plastic deformation capacities of the material constituting the nut to be increased while preserving the mechanical strength and/or the microstructure of said material.

The Applicant observed that, for numerous titanium, nickel or cobalt alloys, in addition to for steels highly resistant to structural hardening, the relative plastic interval represented according to temperature has a maximum value.

The relative plastic interval is defined by the formula $(Rm-Re)/Rm$, with $Rm$ being the ultimate tensile strength and $Re$ being the yield strength or limit of elasticity of the material. It is expressed as a percentage.

At room temperature, for example between 0° C. and 50° C., standard low alloy steels, such as SAE 4340, have a relative plastic interval of approximately 14%. Such a relative plastic interval enables the locking of nuts to be achieved at room temperature, as described in document FR 1 155 186.

However, most of the high strength alloys used in aeronautical construction have a much lower relative plastic interval at room temperature. This characteristic makes the locking of nuts constituted from these alloys difficult due to the problems previously described.

When placed at an optimal temperature, corresponding to the maximum of the relative plastic interval of a high resistance alloy, a wide range of stresses can be exerted on the material without springback or breakage of the material.

Locking by heating is therefore more easily and more efficiently applied when the nut is heated to this optimal temperature, corresponding to the material constituting the nut.

The invention therefore relates to a method for locking a nut with an inner thread, in which:
- the ultimate tensile strength ($Rm$) and yield strength ($Re$) of the material constituting the nut are determined according to temperature,
- an optimal heating temperature is determined, at which a maximum of a relative plastic interval of the material is reached, said relative plastic interval being defined by the formula $(Rm-Re)/Rm$,
- a maximum heating time is determined, above which the nut presents the risk of deterioration of its microstructure and/or of its initial mechanical strength,
- the nut is heated to a temperature substantially equal to said optimal temperature and for a heating time of less than said maximum time so that the initial microstructure and mechanical strength of the material constituting the nut are preserved.
- a body of the nut is deformed locally by bending.

According to a preferable embodiment of the invention, a nut is heated to a temperature of between 80% and 120% of the optimal temperature, the temperatures being expressed in ° C.

According to a preferable embodiment of the invention, heat is only applied to the one part of the nut on which the deformation is applied.

According to a preferable embodiment of the invention, the nut is heated locally before locally deforming, by bending, its outer wall in the area where the inner thread is located, by applying a stress along a diametrical direction on at least two sides of the body of the nut.

According to a preferable embodiment of the invention, the method does not comprise a subsequent step involving heat treatment. It is particularly advantageous to perform the locking deformation on the nut in its final heat treatment stage, as the locking torque thus obtained cannot become modified by subsequent processes. In the prior art, known methods involve deforming the nut in an annealed temper, additional heat treatment being required to create the level of mechanical strength required in the material. This heat treatment releases residual stresses induced by prior deformation of the nut. The release of the stresses causes deformation, opposing the initial deformation, which significantly modifies the locking torque initially measured.

BRIEF DESCRIPTION OF THE DRAWINGS

The invention and its different applications will be better understood after reading the following description and after examining the accompanying figures. These are intended for purposes of illustration only and are not intended to limit the scope of the invention. The figures show.

DETAILED DESCRIPTION

As illustrated in the aforementioned document FR 1 155 186, locking by radial deformation of the wall of a nut consists in locally deforming at least two sides of the body of said nut by compression. The deformation behaviour of the material constituting the nut is directly reflected by its mechanical bending strength characteristics. Similarities however exist between the bending behaviour of metal alloys and their tensile behaviour. For most known alloys, scientific literature is rich in data relating to tensile strength, which is not the case for bending strength. In the following text, reference will thus be made to the tensile behaviour characteristics of metals.

Figure 1:
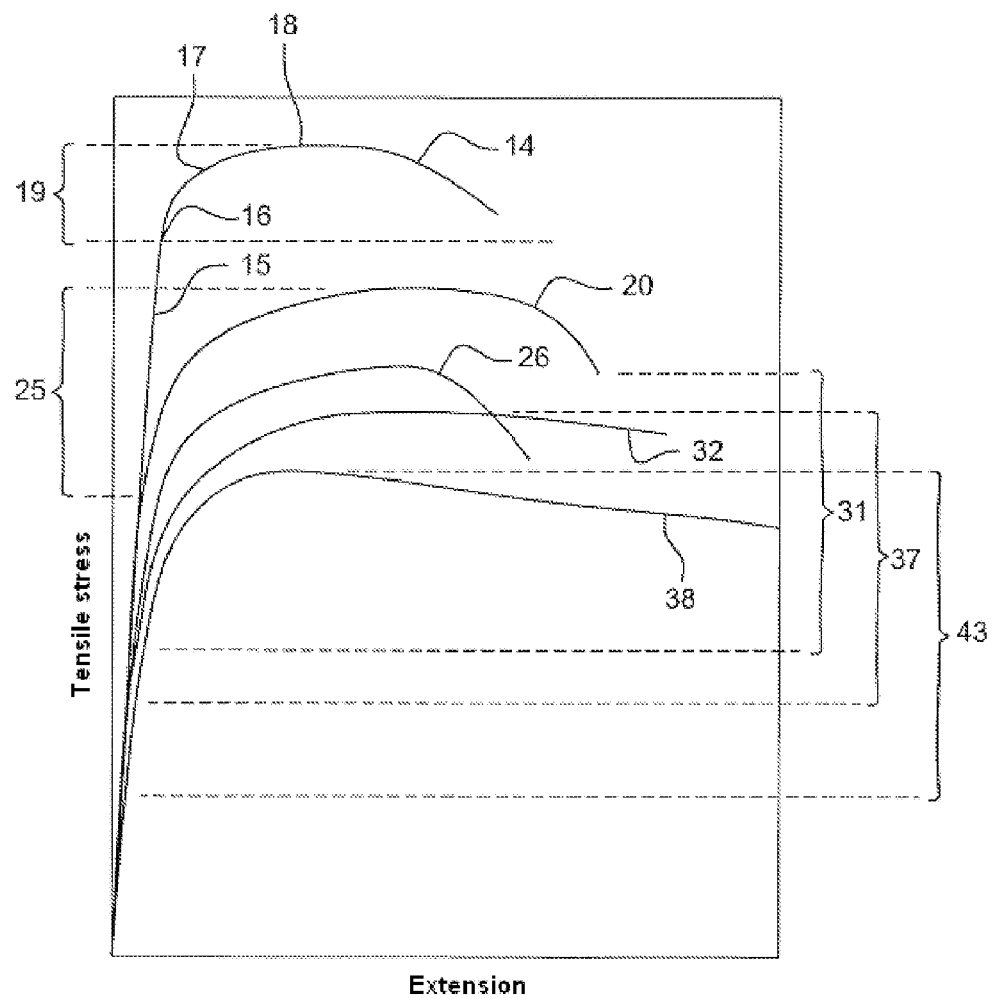
FIG. 1: a graphical representation of the variation in tensile stress, plotted in ordinates, according to the deformation by extension, plotted in abscissae, for different heating temperature levels, for one example of a given material of a nut.

FIG. 1 shows how the appearance of a typical tensile curve of a metallic material evolves according to the testing temperature. Each curve represents the variation in tensile stress, plotted in ordinates, according to the deformation by extension of a test sample, plotted in abscissae, for a given temperature level.

Curve 14 corresponds to a tensile test performed at room temperature. A rectilinear part 15 can be observed starting at zero and reaching a stress 16 corresponding to the yield strength, also conventionally referred to as limit of elasticity and represented by the term Re. The corresponding extension shown in abscissae is referred to as stretch, as in this rectilinear part 15 of the curve, the deformation by extension returns to zero if the tensile stress applied to the sample is removed.

If the stress applied increases beyond value 16, the curve bends at an increasing rate according to part 17 until the stress reaches a maximum value 18, referred to as the ultimate tensile strength and conventionally represented by the term Rm. In this curvilinear part 17, the deformation by extension remains when a tensile stress applied to the sample is removed. A permanent extension is thus observed, represented by a plastic deformation and no longer by an elastic deformation as was the case throughout the rectilinear part.

The tensile stress corresponding to the maximum 18 corresponds to breakage of the sample.

The portion of curve 17 located between the yield strength 16 and the maximum ultimate strength 18 represents the range of plasticity 19. The difference between the ultimate strength and the yield strength (Rm−Re) represents the plastic interval. In order to make a part made out of metallic material change shape, this part must be subjected to a level of stress falling within this interval of plasticity.

Curves 20, 26, 32 and 38 correspond to tensile tests performed on the same material and at the increasing temperatures of 190° C., 360° C., 470° C. and 520° C. respectively. Curves 20, 26, 32 and 38 each present a plastic interval with reference numbers 25, 31, 37 and 43 respectively. The plastic interval is defined by the formula (Rm−Re), with Rm being the mechanical tensile strength and Re being the yield strength.

All of curves 14, 20, 26, 32 and 38 show that, as the testing temperature increases, the ultimate strength decreases and the yield strength decreases at an even faster rate, thus causing a significant increase in the plastic interval.

A set of curves similar to those shown in FIG. 1 can be drawn up experimentally for each metal alloy, for which the tensile behaviour compared to room temperature and increasing testing temperatures is being studied.

From such a set of curves, drawn up for a given alloy in a given heat treatment temper, a graph can be produced such as those shown in FIGS. 2 to 5, which provide a synthetic representation of the development of the plastic interval according to temperature.

Using these curves, the Applicant observed that, for numerous titanium, nickel or cobalt alloys, in addition to for steels highly resistant to structural hardening, the relative plastic interval represented according to temperature has a maximum value.

The relative plastic interval is defined by the formula (Rm−Re)/Rm, with Rm being the ultimate tensile strength and Re being the yield strength of the material.

When placed at an optimal temperature, corresponding to the maximum of the relative plastic interval, a wide range of stresses can be exerted on the material without springback or breakage of the material. Locking by heating is therefore more easily and more efficiently applied when the nut is heated to this optimal temperature.

Figure 2:
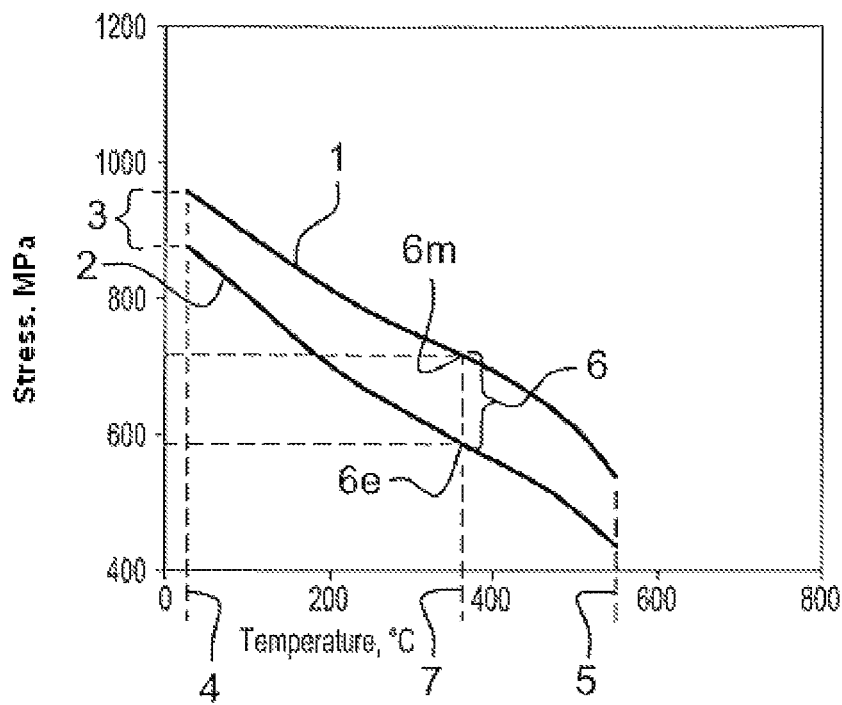
FIG. 2: a graphical representation of the variation in ultimate tensile strength Rm and yield strength Re, plotted in ordinates, according to the heating temperature, plotted in abscissae, for a first example of a material of a nut.

In the example according to FIG. 2, the material constituting the nut is a titanium alloy, widely used in the aeronautical industry, referred to as Ti6Al4V according to international standards. The alloy in question is mainly comprised of titanium alloyed with 6% aluminium and 4% vanadium. In this example, the alloy Ti6Al4V constituting the nut is in the annealed temper. This temper corresponds to a heat treatment comprising maintenance at a high temperature followed by slow cooling which enables the material to acquire a minimum level of mechanical strength and correlatively a maximum level of ductility for this alloy. In this annealed temper and at room temperature, the alloy Ti6Al4V has a ultimate tensile strength of approximately 950 MPa and a yield strength of approximately 850 to 900 MPa. Nevertheless, its plastic deformation capacity at room temperature remains limited.

In FIG. 2, curve 1 represents the ultimate tensile strength of the considered alloy, plotted in ordinates, according to the testing temperature, plotted in abscissae. Curve 2 represents the yield strength or limit of elasticity according to temperature. At room temperature 4, for example of between 0° C. and 50° C., distance 3 separating curve 1 and curve 2 corresponds to the difference between the ultimate strength and the yield strength of the material constituting the nut, in other words, the plastic interval of said material. In this example, the plastic interval 3 is equal to: 950−880=70 MPa. The relative plastic interval is therefore equal to 70/950=7.4%

This value for the relative plastic interval is much lower than the 14% ratio observed for standard low alloy steels.

According to the curves in FIG. 2, the relative plastic interval can be observed to be at its maximum at an optimal temperature 7, equal to 370° C. The plastic interval 6 is equal to the difference between the ultimate strength 6m at 370° C. and the yield strength 6e at 370° C., i.e. 720−590=130 MPa. The relative plastic interval at 370° C. is therefore 130/720=18% This value is clearly higher than the 7.4% corresponding to the relative plastic interval at room temperature 4.

The optimal heating temperature determined above is much lower than the raised temperatures normally used for shaping metals by forging, which are over 900° C. Heating a nut made out of annealed Ti6Al4V to 370° C. preserves the physical characteristics of the material such as its mechanical strength and microstructure.

According to the invention, for heating before deformation of a nut made out of the material according to the aforementioned example, the temperature is substantially adjusted to the optimal value determined, i.e. 370° C. Preferably, a temperature of between 80% and 120% of the calculated optimal value is applied, i.e. between 300° C. and 440° C. In one preferred example, during the nut heating process, the temperature of the nut is measured by means of an optical pyrometer.

The heating time is chosen so that this does not present any risk of sustained modification to the mechanical strength of the material, as produced, for example, during an ageing heat treatment process. This depends on the material, the mass of the nut and on the heating means used.

Preferably, the heating time is less than one minute. This time is generally sufficient to bring a part of the nut to the desired temperature. Moreover, this time is significantly less that the times required for the heat treatment of metal alloys, generally equal to approximately several hours. A heating time of less than one minute guarantees than no structural change will occur during the implementation of the method according to the invention.

Figure 3:
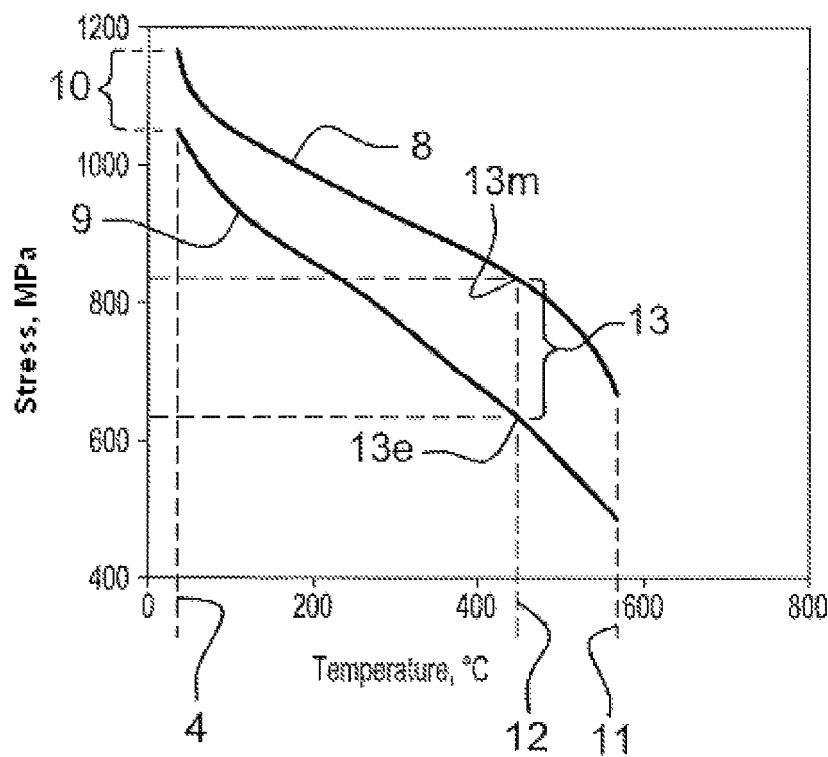
FIG. 3: a graphical representation of the variation in ultimate tensile strength Rm and yield strength Re, plotted in ordinates, according to the heating temperature, plotted in abscissae, for a second example of a material of a nut.

FIG. 3 represents in a graphic manner the variation in ultimate tensile strength and the variation in yield strength, plotted in ordinates according to the testing temperature, plotted in abscissae, for a second example of the material used for the manufacture of nuts. This material is the titanium alloy Ti6Al4V having undergone a specific heat treatment to provide it with a mechanical strength of approximately 1150 MPa at room temperature. The Ti6Al4V alloy having undergone such a treatment is referred to as being in the "as-quenched—aged" temper.

To explain this choice in material, it should be specified that current aeronautical applications lead to the increasing use of materials with a mechanical strength significantly higher than 900 MPa at room temperature. This is the case for numerous standard low alloy steels, whose mechanical strength exceeds 1100 MPa. However, these steels have a relatively high density, which counteracts the reduction in mass on aircraft.

For this purpose, in developments for new, high performance aircraft, constructors are looking for materials lighter than standard low alloy steels, however with a mechanical strength of more than 1100 MPa. This is the case for the aforementioned titanium alloy Ti6Al4V, for which numerous works have been performed with the purpose of increasing its mechanical strength, which until this point, was limited to 900 MPa in the tempered state. These works have resulted in the development of a special heat treatment process, consisting in solution annealing at approximately 930° C., immediately followed by water quenching, then by a hardening treatment by ageing within a temperature range from 500° C. to 550° C. This treatment provides the Ti6Al4V alloy with a ultimate tensile strength of approximately 1150 MPa, however it is accompanied by a significant drop in its ductility and plasticity characteristics. This disadvantage constitutes an obvious, major problem for using this alloy in certain applications, and in particular for the manufacture of nuts locked by deformation.

According to FIG. 3, curve 8 represents the variation in ultimate tensile strength Rm of the considered alloy Ti6Al4V in the as-quenched—aged temper, plotted in ordinates, according to the testing temperature, plotted in abscissae. Curve 9 represents the variation in yield strength Re, plotted in ordinates, according to temperature, plotted in abscissae.

At room temperature 4, the distance 10 separating curve 8 and curve 9 corresponds to the difference between the ultimate tensile strength and the yield strength, in other words, the plastic interval of the alloy considered. In this example, the plastic interval 10 is equal to: 1170−1030=140 MPa. The relative plastic interval is therefore equal to: 140/1170=12%. This value is lower than the 14% ratio observed for standard low alloy steels.

According to the curves in FIG. 3, the relative plastic interval can be observed to be at its maximum at an optimal temperature 12 of 450° C. At this temperature, the difference 13 between the ultimate tensile strength 13m and the yield strength 13e is equal to: 825−630=195 MPa. The relative plastic interval at 450° C. is therefore equal to: 195/825=23%, a value much higher than the value of 12% observed at room temperature.

According to the invention, for heating before deformation of a nut made out of the material according to the aforementioned example, the temperature is substantially adjusted to the optimal value determined, i.e. 450° C. Preferably, a temperature of between 80% and 120% of the optimal value calculated is applied, i.e. between 360° C. and 540° C. 5, 11 (FIG. 2, FIG. 3). As indicated, for example in FIG. 2, the heating time is preferably chosen to be less than 1 minute.

Figure 4:
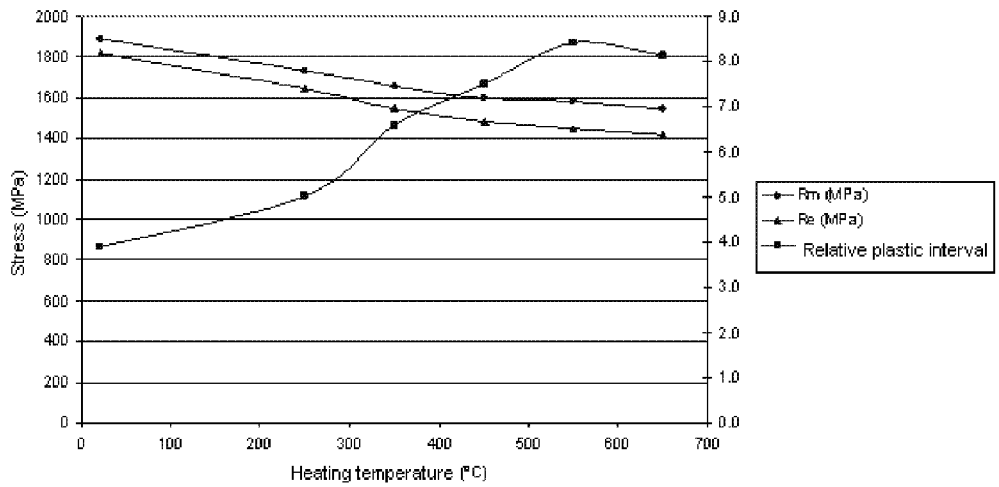
FIG. 4: a graphical representation of the variation in ultimate tensile strength Rm, yield strength Re and relative plastic interval, plotted in ordinates, according to the heating temperature, plotted in abscissae, for a third example of a material.

The Applicant highlighted that the maximum presented by the relative plastic interval exists for different materials whose mechanical strength at room temperature is more than 900 MPa. Thus, FIG. 4 represents in a graphic manner the variation in ultimate tensile strength and the variation in yield strength, plotted in ordinates, according to the testing temperature, plotted in abscissae, for a third example of material. This example uses a multi-phase alloy comprised of Co—Ni26Cr19Fe9Mo7 (known as MP159®) which, in the strain-hardened—aged temper, has a mechanical strength of more than 1800 MPa at room temperature.

Although this alloy is not frequently used to manufacture nuts, an optimal heating temperature can be established in the aforementioned manner, at which there is an optimal relative plastic interval higher than the plastic interval measured at room temperature.

At room temperature, the plastic interval for this alloy is equal to: 1891−1817=73 MPa. The relative plastic interval is therefore equal to: 74/1891=4%

In the example according to FIG. 4, the plastic interval is at its maximum at an optimal temperature of 550° C. The plastic interval is equal to the difference between the ultimate tensile strength at 550° C. and the yield strength at 550° C., i.e. 1579−1446=133 MPa. The relative plastic interval at 550° C. is therefore 133/1579=8.4%, a value much higher than the relative plastic interval at room temperature of 4% as previously described.

According to the invention, for heating before deformation of an element made out of the material according to the aforementioned example, the temperature is substantially adjusted to the optimal value determined, i.e. 550° C. Preferably, a temperature of between 440° C. and 660° C. is applied. For a standard nut, a heating time of less than 1 minute is sufficient. This time is significantly less than the heating times used for the ageing heat treatment processes for this material, equal to approximately 4 hours.

Figure 5:
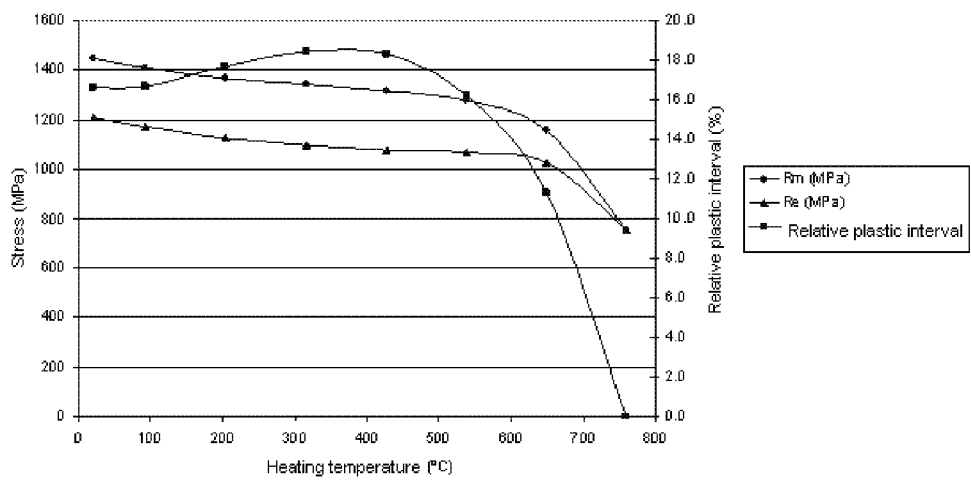
FIG. 5: a graphical representation of the variation in ultimate tensile strength Rm, yield strength Re and relative plastic interval, plotted in ordinates, according to the heating temperature, plotted in abscissae, for a fourth example of a material.

In order to demonstrate the existence of this relative plastic interval, FIG. 5 represents in a graphic manner, the variation in ultimate tensile strength and the variation in yield strength, plotted in ordinates, according to the testing temperatures, plotted in abscissae, for a fourth example of material. This example uses a Nickel-based alloy comprised of Ni—Cr19Fe19Nb5Mo3 (known as Inconel® 718) which, in the solution annealed—aged temper, has a mechanical strength of approximately 1400 MPa at room temperature.

This alloy used in the manufacture of nuts is not traditionally locked by heating, as it has a plastic interval at room temperature of more than 14%. Nevertheless, using the aforementioned method, an optimal heating temperature can be established, at which a maximal relative plastic interval exists, higher than the plastic interval measured at room temperature.

At room temperature, the plastic interval for this alloy is equal to: 1448−1207=241 MPa. The relative plastic interval is therefore equal to: 241/1448=16.6%

In the example according to FIG. 5, the plastic interval is at its maximum at an optimal temperature of 316° C. The plastic interval is equal to the difference between the ultimate tensile strength at 316° C. and the yield strength at 316° C., i.e. 1344−1096=248 MPa. The relative plastic interval at 316° C. is therefore 248/1344=18.5%, a value slightly higher than the relative plastic interval at room temperature of 16.6% as previously described.

According to the invention, for heating before deformation of an element made out of the material according to the aforementioned example, the temperature is substantially adjusted to the optimal value determined, i.e. 316° C. Preferably, a temperature of between 250° C. and 380° C. is applied. For a standard nut, a heating time of less than 1 minute is sufficient. This time is significantly less than the heating times used for the ageing heat treatment processes for this material, equal to approximately 16 hours.

Thus, the method according to the invention can be applied to numerous materials known to be difficult with regard to plastic deformation at room temperature, in their heat treatment temper for final use. The method is particularly applicable to most titanium, nickel and cobalt alloys and to certain steels highly resistant to structural hardening.

The method according to the invention presents undeniable technical and economic advantages. Indeed, the judicious choice in temperature eases the precise adjustment operations for the deformation of the body of the nut in order to adjust the locking torque within the minimum/maximum range required by the technical specifications. Moreover, the increase in the relative plastic interval connected to heating enables the locking deformation to be performed on the nut in its final heat treatment temper.

Figure 6:
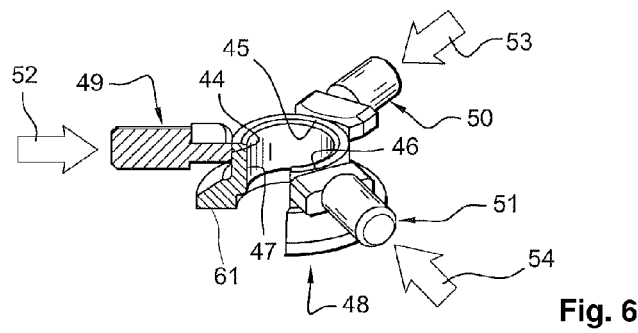
FIG. 6: a schematic representation of an oblique perspective view of the locking of a nut by deformation, according to one embodiment of the invention.

In order to better understand the application of the method, refer to FIG. 6, which represents in a schematic manner an oblique perspective view of an unlimited example of equipment used to locally deform a nut 48.

This deformation particularly takes place after having locally heated the nut, for example by means of a ring-shaped inductor connected to a high frequency induction generator. Alternatively, laser-type heating means can be used. The upper half of nut 48, on which the locking deformation is to be applied, has been heated, said upper part being located opposite a support side 61 of said nut. The heating means is adjusted so as to obtain the optimal temperature conditions corresponding to the material constituting the nut, determined as shown in the examples corresponding to FIGS. 2 to 5. As previously indicated, a heating time of approximately one minute is generally sufficient to bring the upper part of nut 48 to the desired temperature.

In the example according to FIG. 6, three points have been locally deformed, corresponding to three equidistant sides 44, 45 and 46 of the body 47 of the nut 48, in a hexagonal shape suitable for a spanner wrench, by means of three pressure pins 49, 50 and 51, assembled onto three mobile supports in translation according to three axes 52, 53 and 54 positioned on the same plane and convergent according to angles of 120° C.

The pressure pins 49, 50 and 51 have a shape suitable for each type of nut, be it circular, oval or rectangular in shape. Typically, the impressions formed by pins 49, 50 and 51 do not affect more than half of the height of sides 47 of the nut 48 so as not to deform a too large number of inner threads (not represented in FIG. 6). Indeed, too many inner threads being deformed for locking purposes would prevent the nut from being screwed onto the associated screw.

As soon as the locking operation by deformation has been performed, the locking torque thus obtained can be checked by standard measurement means, to be located within the minimum/maximum range defined by the applicable technical specifications.

The invention claimed is:

1. A method for locking a nut with an inner thread, comprising the steps of:

heating a nut having an inner thread and formed from a material having known values of ultimate tensile strength (Rm) and yield strength (Re) corresponding to a first plurality of temperatures, and wherein the material of the nut also has a relative plastic interval corresponding to each temperature of the first plurality of temperatures, said relative plastic interval being defined by the formula (Rm−Re)/Rm where Rm and Re are determined from the known values corresponding to temperatures, and wherein the material further has an optimal heating temperature at which a maximum of a relative plastic interval of the material of the nut occurs, obtaining a maximum heating time for a temperature within a first range of temperatures including the first plurality of temperatures, above which the nut presents a risk of deterioration of a microstructure of the nut or of an initial mechanical strength of the nut, wherein heating the nut includes heating the nut to a temperature within a second range of temperatures defined between 80% and 120% of the optimal heating temperature, the temperature being expressed in ° C., and for a heating time of less than said maximum heating time so that the initial microstructure and mechanical strength of the material constituting the nut are preserved, deforming a body of the nut locally by bending once the nut has been heated to the temperature within the second range of temperatures.

2. A method according to claim 1, wherein heat to reach the optimal heating temperature is applied to only one part of the nut on which the deformation is applied.

3. A method according to claim 2, wherein the nut is deformed using pressure pins applied in a radial manner with respect to an axis of symmetry of the nut, and at most to one half of the body of the nut opposite a supporting side of said nut.

4. A method according to claim 1, characterised in that the nut is heated for less than one minute.

5. A method according to claim 1, wherein deforming a body of the nut includes deforming the body of the nut wherein the material constituting the nut is chosen from a titanium alloy, nickel alloy, cobalt alloy or from a steel highly resistant to structural hardening.

6. A method according to claim 5, wherein the constitutive material, at room temperature, has a relative plastic interval of less than 14% or whose mechanical strength is more than 900 MPa.

7. A method according to claim 6, wherein the nut is heated to a temperature of between 360° C. and 540° C. when Ti6Al4V alloy has undergone an as-quenched—aged temper heat treatment.

8. A method according to claim 6, wherein deforming a body of the nut includes deforming the body of the nut wherein the constitutive material of the nut is Ti6Al4V alloy.

9. A method according to claim 8, wherein the nut is heated to a temperature of between 300° C. and 440° C. when Ti6Al4V alloy has undergone an annealed temper heat treatment.

10. A method according to claim 5, wherein deforming a body of the nut includes deforming the body of the nut wherein the constitutive material of the nut is Ti6Al4V alloy.

11. A method according to claim 10, wherein the nut is heated to a temperature of between 300° C. and 440° C. when Ti6Al4V alloy has undergone an annealed temper heat treatment.

12. A method according to claim 1, wherein heating the nut to the optimal heating temperature is performed on the nut in its final heat treatment temper.

* * * * *